(12) United States Patent
Paczkowski et al.

(10) Patent No.: US 12,278,860 B2
(45) Date of Patent: *Apr. 15, 2025

(54) METHODS AND SYSTEMS FOR DISTRIBUTING RENDERING ACROSS DEVICES IN A CUSTOMER PREMISE

(71) Applicant: T-Mobile Innovations LLC, Overland Park, KS (US)

(72) Inventors: Lyle W. Paczkowski, Mission Hills, KS (US); George Jason Schnellbacher, Leawood, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,363

(22) Filed: Sep. 1, 2023

(65) Prior Publication Data

US 2024/0106884 A1  Mar. 28, 2024

Related U.S. Application Data

(63) Continuation of application No. 17/955,096, filed on Sep. 28, 2022, now Pat. No. 11,792,259.

(51) Int. Cl.
*H04L 67/10* (2022.01)
*G06T 15/00* (2011.01)

(52) U.S. Cl.
CPC ............... *H04L 67/10* (2013.01); *G06T 15/00* (2013.01)

(58) Field of Classification Search
CPC .................................. H04L 67/10; G06T 15/00
See application file for complete search history.

(56) References Cited

U.S. PATENT DOCUMENTS

| 5,555,244 A | 9/1996 | Gupta et al. |
| 6,172,990 B1 | 1/2001 | Deb et al. |
| 6,512,773 B1 | 1/2003 | Scott |
| 6,693,900 B1 | 2/2004 | Kaaresoja et al. |
| 6,760,345 B1 | 7/2004 | Rosengard |
| 7,581,094 B1 | 8/2009 | Apostolopoulos et al. |
| 7,793,823 B2 | 9/2010 | Klein, Jr. |
| 9,317,622 B1 | 4/2016 | Zuromski et al. |
| 10,348,505 B1 | 7/2019 | Crawforth et al. |
| 10,608,895 B2 | 3/2020 | Shaw et al. |
| 11,100,197 B1 | 8/2021 | Bernardi |

(Continued)

OTHER PUBLICATIONS

Foreign Communication from a Related Counterpart Application, International Search Report and Written Opinion dated Oct. 23, 2023, International Application No. PCT/US2023/071274.

(Continued)

*Primary Examiner* — El Hadji M Sall

(57) ABSTRACT

A method comprising distributing rendering of media content across an end user device and a rendering device located at a single premise based on instruction sets carried in a ledger associated of the media or based on distributed applications respectively stored at the end user device and rendering device. The method further comprises integrating, by the end user device, rendered content received from the rendering device with data obtain from performing processing and rendering operations at the end user device to obtain a final render of the media content, and displaying, on a display of the end user device, the final render of the media content.

20 Claims, 8 Drawing Sheets

(56) References Cited

U.S. PATENT DOCUMENTS

| | | |
|---|---|---|
| 11,611,615 B1 | 3/2023 | Long et al. |
| 11,792,259 B1 | 10/2023 | Paczkowski et al. |
| 11,818,207 B1 | 11/2023 | Paczkowski et al. |
| 12,003,660 B2 * | 6/2024 | Bernardi ............... H04L 67/104 |
| 12,132,782 B2 | 10/2024 | Paczkowski et al. |
| 2002/0003811 A1 | 1/2002 | Herrmann |
| 2002/0163911 A1 | 11/2002 | Wee et al. |
| 2004/0091114 A1 | 5/2004 | Carter et al. |
| 2007/0130359 A1 | 6/2007 | Amini et al. |
| 2009/0327244 A1 | 12/2009 | Rizal |
| 2011/0222683 A1 | 9/2011 | Struik |
| 2013/0046968 A1 | 2/2013 | Dinan |
| 2013/0275755 A1 | 10/2013 | Ignatchenko |
| 2015/0379276 A1 | 12/2015 | Glickman et al. |
| 2017/0163733 A1 | 6/2017 | Grefen et al. |
| 2017/0289316 A1 | 10/2017 | Solis |
| 2018/0103122 A1 | 4/2018 | Rothera et al. |
| 2018/0276600 A1 | 9/2018 | Fuller et al. |
| 2018/0323980 A1 | 11/2018 | Ahn et al. |
| 2019/0109713 A1 | 4/2019 | Clark et al. |
| 2019/0114182 A1 | 4/2019 | Chalakudi et al. |
| 2019/0121673 A1 | 4/2019 | Gold et al. |
| 2019/0158269 A1 | 5/2019 | Kesarwani et al. |
| 2019/0266132 A1 | 8/2019 | Rubenstein |
| 2019/0334985 A1 | 10/2019 | Bradley et al. |
| 2020/0014988 A1 | 1/2020 | Navali et al. |
| 2020/0159889 A1 | 5/2020 | Chui et al. |
| 2020/0159890 A1 | 5/2020 | Chui et al. |
| 2020/0169382 A1 | 5/2020 | Factor et al. |
| 2020/0302431 A1 | 9/2020 | Polehn et al. |
| 2021/0027265 A1 | 1/2021 | Hasek, IV |
| 2021/0029216 A1 | 1/2021 | Stockert et al. |
| 2021/0117982 A1 | 4/2021 | Johnson et al. |
| 2021/0274235 A1 | 9/2021 | Anderegg et al. |
| 2021/0329075 A1 | 10/2021 | Sardesai et al. |
| 2021/0360500 A1 | 11/2021 | Mehta et al. |
| 2021/0377041 A1 | 12/2021 | Covaci et al. |
| 2022/0038260 A1 | 2/2022 | Chakra et al. |
| 2022/0038288 A1 | 2/2022 | Chakra et al. |
| 2022/0159096 A1 | 5/2022 | Mantri et al. |
| 2022/0182217 A1 | 6/2022 | Jaquette et al. |
| 2022/0182219 A1 | 6/2022 | Jaquette et al. |
| 2022/0217317 A1 | 7/2022 | Xu et al. |
| 2022/0263786 A1 | 8/2022 | Brown et al. |
| 2022/0351468 A1 | 11/2022 | Rahman et al. |
| 2022/0407707 A1 | 12/2022 | Gaur et al. |
| 2022/0414664 A1 | 12/2022 | Liu et al. |
| 2023/0032836 A1 | 2/2023 | Pabón et al. |
| 2023/0111001 A1 | 4/2023 | Jaquette et al. |
| 2023/0185996 A1 | 6/2023 | Jenrola |
| 2024/0015212 A1 | 1/2024 | Paczkowski et al. |
| 2024/0104817 A1 | 3/2024 | Paczkowski et al. |

OTHER PUBLICATIONS

Notice of Allowance dated Jun. 2, 2023, U.S. Appl. No. 17/955,096, filed Sep. 28, 2022.

Notice of Allowance dated Jul. 3, 2023, U.S. Appl. No. 17/860,937, filed Jul. 8, 2022.

Paczkowski, Lyle W., et al., "Methods and Systems for Distributing Rendering Across Devices in a Customer Premise," filed Sep. 28, 2022, U.S. Appl. No. 17/955,096.

"Paczkowski, Lyle W., et al., ""Methods and Systems for Distributing Rendering Across Devices in a Customer Premise,"" filed Jul. 28, 2023, International Application No. PCT/US23/71274."

Paczkowski, Lyle W., et al., "Methods and Systems for Ledger Based Content Delivery Using a Mobile Edge Computing (MEC) Server," filed Sep. 25, 2023, U.S. Appl. No. 18/474,018.

Office Action dated Mar. 26, 2024, U.S. Appl. No. 18/474,018, filed Sep. 25, 2023.

Notice of Allowance dated Jul. 11, 2024, U.S. Appl. No. 18/474,018, filed Sep. 25, 2023.

* cited by examiner

METHODS AND SYSTEMS FOR DISTRIBUTING RENDERING ACROSS DEVICES IN A CUSTOMER PREMISE

CROSS-REFERENCE TO RELATED APPLICATIONS

This application is a continuation of and claims priority under 35 U.S.C. § 120 to U.S. patent application Ser. No. 17/955,096 filed on Sep. 28, 2022, entitled "Methods and Systems for Distributing Rendering Across Devices in a Customer Premise," by Lyle W. Paczkowski, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Currently, streaming media transmission through the network accounts for about 82 percent (%) of total Internet traffic, with the amount of bandwidth occupied by streaming media transmissions exponentially increasing each year. Media content is conventionally sent from content servers directly to end user devices, such that the end user device is responsible for streaming and rendering the media content. However, increasing numbers of end user devices, such as wearable devices and Internet of Things (IoT) devices, do not include the processing, rendering, and power capabilities of standard laptops and handheld devices. For example, end user devices do not include the power capacity to continuously stream and render media content, particularly interactive gaming content. Therefore, there is a need to provide a more efficient mechanism by which to provide streaming media content from the content servers to end user devices.

SUMMARY

In an embodiment, a method for distributing rendering of media content across an end user device and a rendering device located at a single premise is disclosed. The method comprises receiving, by at least one of the end user device or the rendering device, a package comprising content and a ledger associated with the media content. The content comprises data associated with the media content that has not been rendered, and the ledger comprises one or more instruction sets for distributing, processing and rendering of the content across both the end user device and the rendering device. The method further comprises executing, by a first instruction manager application at the rendering device, the one or more instruction sets to determine rendering operations to be performed on the content by the rendering device, performing, by a rendering application at the rendering device, the rendering operations on the content to obtain rendered content, executing, a second instruction manager application at the end user device, the one or more instruction sets to determine processing operations to be performed on the content or the rendered content by the end user device, performing, by a processor at the end user device, the processing operations on the content or the rendered content to obtain a final render of the media content, and displaying, on a display of the end user device, the final render of the media content.

In another embodiment, a method for distributing rendering of media content across an end user device and a rendering device located at a single premise is disclosed. The method comprises obtaining, by the rendering device, a first distributed application comprising a first instruction set for distributing processing and rendering operations across both the end user device and the rendering device. The first instruction set comprises instructions for performing a first subset of the processing and rendering operations used to generate a final render of the media content from content, and the content comprises data associated with the media content that has not been rendered. The method further comprises obtaining, by the end user device, a second distributed application comprising a second instruction set for distributing the processing and rendering operations across both the end user device and the rendering device. The second instruction set comprises instructions for performing a second subset of the processing and rendering operations used to generate the final render of the media content. The method further comprises receiving, by at least one of the end user device or the rendering device, a package comprising the content and a ledger corresponding to the media content, in which the ledger indicates that processing and rendering of the content is to be distributed across both the end user device and the rendering device. The method further comprises executing, by the first distributed application at the rendering device, the first instruction set to perform the first subset of the processing and rendering operations on the content to obtain first rendered content, executing, by the second distributed application at the end user device, the second instruction set to perform the second subset of the processing and rendering operations on the content to obtain second rendered content, and generating, by the second distributed application at the end user device, a final render of the media content using the first rendered content and the second rendered content.

In yet another embodiment, a method for distributing rendering of media content across an end user device and a rendering device located at a single premise is disclosed. The method comprises receiving, by at least one of the end user device or the rendering device, a package comprising content and a ledger associated with the media content. The content comprises data associated with the media content that has not been rendered, and the ledger indicates whether processing and rendering of the content is to be distributed across both the end user device and the rendering device. When the ledger indicates that processing and rendering of the content is to be distributed across both the end user device and the rendering device, the method further comprises executing, by a first application at the rendering device, a first instruction set to perform rendering operations on the content and obtain rendered content, executing, by a second application at the end user device, a second instruction set to perform processing operations on at least one of the content or the rendered content, integrating, by the second application at the end user device, the rendered content with data obtained from performing the processing operations on the at least one of the content or the rendered content to obtain a final render of the media content, and displaying, on a display of the end user device, the final render of the media content.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
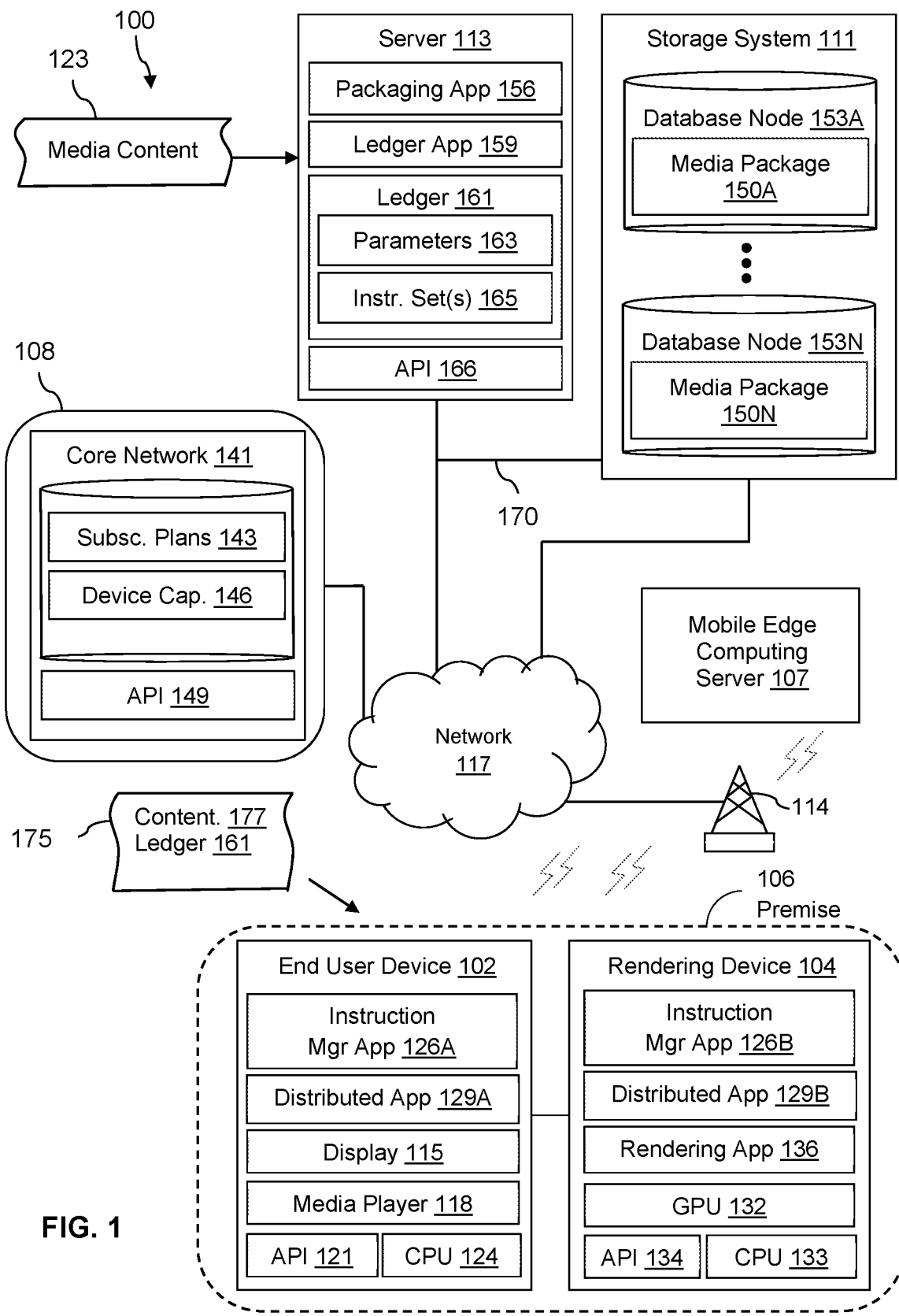
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, streaming media and interactive media, such as gaming, consume the vast majority of home broadband Internet usage. For example, streaming a video in standard definition for an hour uses approximately 1 gigabyte (GB) of data. Switching the streaming to high definition or ultra-high definition raises the data usage to approximately 3 GB or 7 GB of data usage, respectively. In addition, the use of virtual reality (VR) and extended reality (XR) devices (hereinafter referred to augmented reality (AR) devices) that provide immersive user experiences are becoming increasingly more popular, and consume far more data than simply video streaming. Streaming media, streaming AR media, and gaming media may first be published to content servers in raw data form, and then, upon request, transmitted directly to different end user devices. Thus, the network has become flooded with the transmission of different types of streaming media. In this way, the consumption patterns for streaming media and AR/gaming devices may soon provide significant stresses to the network load and capacity.

Moreover, an increasing number of end user devices are becoming smaller in size, to provide more convenient and compact devices for the end user. For example, wearable devices and portable devices have been getting smaller and thinner over time as a result of consumer demand for lightweight wearable devices and easier to carry handheld devices. As these devices get smaller, the devices may lack the requisite hardware to process and render complex media files. These devices may also lack the power supply to process and render such media files for longer periods of time. For example, the battery reserves of these lightweight devices may quickly be depleted by the intense processing required for media rendering. Instead, these devices may only have the hardware and battery reserve for displaying a rendered media stream (i.e., not the actual rendering of the media stream). Therefore, the method of simply transmitting the requested media files to the end user device may soon be outdated since these devices may not be capable of rendering the media. Rendering the media content at a cloud system and transmitting the rendered media content to these devices is one option to avoid performing complex rendering operations on these lightweight devices. However, transmitting rendered media content across the network consumes an excessive amount of network resources due to the size of the rendered media content being transmitted through the network.

The present disclosure addresses the foregoing technical problems by providing a technical solution in the technical field of file transmission across a network. In general, the present disclosure relates to a system for distributing the processing and rendering of media content across multiple devices located at a customer premise (i.e., splitting the processing and rendering tasks involved to render media content across the multiple devices). In an embodiment, the system may include a cloud storage system, a server communicating with the cloud storage system, a core network, and one or more devices at a customer premise. The system components may communicate with one another to provide media content that has not yet been rendered from a content server at the cloud storage system to devices at the customer premise, such that the devices together are responsible for rendering the media content. This enables the delivery of media content to the devices in a more transport efficient manner, while enabling the rendering of the media content in parallel across multiple devices in a more compute efficient manner.

The cloud storage system may be a decentralized file system, such as, for example, an interplanetary file system (IPFS), storing media content in a distributed manner. The devices may include two or more devices located at a single customer premise (e.g., a customer home, office space, business site, etc.), within a certain geographical area associated with the customer premise. The devices may be communicatively coupled together via various types of communication connections, such as, for example, a Wi-Fi connection, a wireless local area network (WLAN) connection, a BLUETOOTH connection, a Near Field Communication (NFC) connection, an ultra-wide band communication connection, etc. Each of the devices may be connected to the Internet via a carrier network operated by a telecommunications carrier, and as such, each device may be registered with the telecommunications carrier under a common customer account. As further described, each device may be associated with different capabilities (e.g., display capabilities, processing capabilities, graphical processing capabilities, power supply limitations, etc.). The capabilities of each of the devices of a customer may be stored at the carrier network and used in a determination of an optimal rendering distribution scheme across two or more devices at the customer premise.

Media content may be published to the storage system. A packaging application at a server coupled to the storage system may segment the content into multiple media packages, each including raw data and files related to a segment of the media content. The storage system may store the different media packages across different database nodes (e.g., IPFS clusters) in the storage system. A ledger application at the server may generate a ledger defining various parameters related to the successful transmission, reassembly, distribution, and rendering of the media packages. In an embodiment, the ledger may be any data structure that may carry parameters and instruction sets used to implement rendering distribution methods, as further described herein. In an embodiment, the ledger may be encoded as a blockchain, with each block in the blockchain carrying at least one of the parameters. For example, the parameters may indicate how to fetch the media packages from the storage system, reassemble the media packages into the requested media content, decrypt the media packages, decompress the media packages, charge/pay for the requested media content, and any other data related to the media packages. Additional details regarding the ledger and the parameters in the ledger is described in U.S. patent application Ser. No. 17/860,937, filed Jul. 8, 2022, by Lyle W. Paczkowski and George Jason Schnellbacher (hereinafter referred to as the "937 patent application"), which is hereby incorporated by reference in its entirety.

In an embodiment, the packaging application may also include an instruction set moderator, which may communicate with core network elements (e.g., Access and Mobility Management Function (AMF) or Session Management Function (SMF)) to retrieve data related to the capabilities of the devices located at a customer premise. For example, the packaging application may communicate with the core network to obtain device capabilities of at least two devices located at a customer premise and registered with the carrier network under the common customer account. The two devices may include an end user device, such as a smart wearable device, and a rendering device, such as a device implemented as a computing device with a powerful graphics processing unit (GPU). The device capabilities may indicate that the end user device has limited graphical processing resources, limited computing resources, and a limited battery reserve, but the device capabilities may indicate that the end user device includes a display. The device capabilities may also indicate that the rendering device includes a high powered GPU, multiple CPUs, and a constant power supply.

After the packaging receives the device capabilities from the core network, the packaging application may determine an optimal rendering distribution scheme between the end user device and the rendering device based on the device capabilities. For example, the packaging application may determine that media content to be displayed at the end user device should be entirely rendered at the rendering device instead of the end user device. This may be because the rendering device has far more graphical processing resources and a constant power supply, whereas the end user device has limited processing resources and a limited battery reserve. The packaging application may also determine that the end user device should generate the final render of the media content for display at the end user device by integrating rendered content received from the rendering device with other processed and rendered data obtained by the end user device.

In an embodiment, the packaging application may generate one or more instruction sets comprising instructions in the form of logic or code based on the determined optimal rendering distribution scheme. The instruction sets may include a set of conditional statements (i.e., if/then statements), which, when executed, instruct different devices located at a customer premise to perform allocated rendering and processing tasks for media content in a distributed manner. In an embodiment, the instruction sets may instruct the end user device to perform certain rendering and processing tasks on media content that has not yet been fully rendered, while instructing the rendering device to perform other rendering and processing tasks on the media content. For example, the packaging application may generate one or more instruction sets instructing the rendering device to render all the media content on behalf of the end user device when the rendering device has greater graphical processing power than the end user device (i.e., includes a GPU), when the rendering device has a more powerful central processing unit (CPU) than the end user device, and/or when the rendering device has a constant supply of power while the end user device has a limited battery reserve. As another example, the packaging application may generate one or more instruction sets instructing the rendering device to perform a first subset of the processing and rendering operations used to render media content, while instructing the end user device to perform a second subset of the processing and render operations used to render media content based on the device capabilities of the rendering device and the end user device.

Once the packaging application generates the instruction sets, the packaging application may transmit the instruction sets to the devices at the customer premise according to various embodiments. In a first embodiment, the packaging application may populate a ledger for the media content including the instruction sets in different fields or blocks of the ledger. In a second embodiment, the packaging application may send these instruction sets to the devices at the customer premise in the form of distributed applications.

In the first embodiment, the packaging application may add the generated instruction sets to the ledger corresponding to the media content, in which each instruction set occupies one field or block of the ledger. The end user device and/or the rendering device may receive a package comprising content related to the media content and the ledger corresponding to the media content. The content may not be rendered yet and include the media files and raw data related to the media content. The content may also include one or more interaction components related to the media content. The package may be delivered to the end user device and/or the rendering device upon the end user device transmitting a request for the media content or upon the server pushing the media content down to the end user device based on expected consumption patterns. When the package is only received by either the end user device or the rendering device, the device may send the package to the other device(s) in the customer premise.

In this embodiment, a first instruction manager application at the rendering device may execute or parse through the instruction sets in the ledger to determine rendering and/or processing operations to be performed by the rendering device on the content. Similarly, a second instruction manager application at the end user device may execute or parse through the instruction sets in the ledger to determine rendering and/or processing operations to be performed by the end user device on content received from the rendering device that may have been at least partially rendered by the rendering device. Subsequently, a rendering application at the rendering device may perform the rendering and/or processing operations on the content according to the instruction sets in the ledger to obtain rendered content. The rendering device may transmit the rendered content to the end user device for reassembly and integration with any other data being processed or rendered at the end user device. A processor at the end user device may perform the rendering and/or processing operations on the content and/or the rendered content received from the rendering device according to the instruction sets to obtain a final render of the media content. The end user device may then display the final render of the media content on a display of the end user device.

In the second embodiment, the packaging application may generate different distributed applications with different instruction sets based on the distributed responsibilities of the different devices located at the customer premise. A first distributed application including one or more first instruction sets may be obtained (e.g., received or downloaded) at the rendering device, while a second distributed application including one or more second instruction sets may be obtained at the end user device. The first instruction sets may include instructions for performing a first subset of the processing and rendering operations on the content to generate a final render of the media content. The second instruction set may include other instructions for performing a second subset of the processing and rendering operations used to generate the final render of the media content. The packaging application may send the distributed applications to the devices over the air at any time, such as, for example, upon receiving a request for the media content or when the devices are instantiated with the carrier network.

At least one of the end user device or the rendering application may receive a package comprising the content that has not yet been rendered and the ledger corresponding to the media content. In this embodiment, the ledger may indicate that the processing and rendering of the content is to be distributed across multiple devices at the customer premise (i.e., the end user device and the rendering device). The ledger may also include other instruction sets that may be accessed by the distributed applications to exert more fine-grained control of the distributed nature of the rendering. The first distributed application at the rendering device may execute the first instruction set to perform the first subset of the processing and rendering operations to obtain first rendered content, while the second distributed application at the end user device may execute the second instruction set to perform the second subset of the processing and rendering operations to obtain second rendered content.

In some embodiments, the first distributed application and the second distributed application may also extract rendering specifications, reassembly instructions, encryption and decryption schemes, compression and decompression schemes, etc., from the ledger while performing the respective subset of the processing and rendering operations. In this way, the distributed applications may perform the processing and rendering operations independently yet in a coordinated manner based also on the details received in the ledger. For example, the ledger may indicate an integration or reassembly of the different portions of rendered content performed across the different devices. In this case, the second distributed application may integrate or reassemble the first rendered content and the second rendered content according to the indications in the ledger to generate the final render of the media content, for display at the end user device.

In this way, the embodiments disclosed herein reduce traffic in the network by distributing the ledgers, distributed applications, and/or content to the devices at a customer premise. The devices at the customer premise may split the rendering responsibility according to the respective capabilities of the device using instruction sets in the distributed application or the ledgers, in a manner such that the lightweight end user device is not responsible for the heavy computations involved in rendering the media content. This is because the customer premise may include a much more powerful rendering device that can perform the rendering computations on behalf of the lightweight end user device.

The powerful rendering performed by the rendering device based on the instruction sets in the ledger and/or distributed applications enables the rendered content to be lossless and in high fidelity (e.g., 4K, 3-dimensional (3D), or 360° stereoscopic video), with low latency. Since all the rendering is performed at the customer premise, only the content, on which rendering has not been performed, and the interaction components (e.g., raw data) may need to be transmitted through the network, as opposed to transmitting heavyweight rendered content files, which may exhaust the network transport resources. Therefore, the transmission of the content to multiple devices at the customer premise reduces the volume of data needed to be transported through the network for media streaming, enabling a far more transport and compute efficient manner of rendering complex media streams. In this way, end user devices, particularly the lighter weight and less complex devices, may display the rendered content, while performing little to no rendering, buffering, or other complex processing at the end user device side. By reducing the computations done at the end user devices, the methods disclosed herein also enable the extension of the battery life of the end user devices.

Turning now to FIG. 1, a communication system 100 is described. The system 100 comprises devices 102 and 104 located at a premise 106, a mobile edge computing (MEC) server 107, a carrier network 108, a storage system 111, a server 113 in communication with the storage system 111, a cell site 114, and a network 117. The devices 102 and 104 located on the premise 106 include an end user device 102 and a rendering device 104. A premise may refer to a geographical area, a building, or at least a portion of the building, such as, for example, a private home, an office location, a hotel room, a bar, a medical office, a hospital, etc. The end user device 102 and the rendering device 104 may be communicatively coupled to the MEC server 107, carrier network 108, storage system 111, and server 113 via the cell site 114. The MEC server 107 may also be communicatively coupled to the end user device 102, rendering device 104, carrier network 108, storage system 111, and server 113 via the cell site 114.

The end user device 102 may be a cell phone, a mobile phone, a smart phone, a personal digital assistant (PDA), an Internet of things (IoT) device, a wearable device, an AR device, a headset device, a laptop computer, a tablet computer, a notebook computer, a medical device, a vehicle computer, etc. The end user device 102 includes a display 115, a media player 118, one or more application program interfaces (APIs) 121, and a central processing unit (CPU) 124. The display 115 may be a computer output surface or projecting mechanism that shows media content 123 to an end user operating the end user device 102. The media content 123 may be, for example, graphical images, audio, video, or any type of AR stream. The media player 118 may be a software program or hardware device configured to play the media content 123 via the display 115. The media player 118 may obtain a final rendered version of the media content 123 and play the rendered media content 123 on the display 115. The APIs 121 may be interfaces by which the end user device 102 may communicate with the rendering device 104, MEC server 107, carrier network 108, storage system 111, and server 113. The CPU 124 may be a central processor of the end user device 102, which may include one or more processors that executes instructions including a computer program to provide the functions of the end user device 102 described herein. The end user of the end user device 102 may be a subscriber of the carrier network 108, registered with the carrier network 108.

The end user device 102 may also include an instruction manager application 126A and/or one or more distributed applications 129B. The instruction manager application 126A may parse through and execute instruction sets 165 received in one or more ledgers 161, as described herein. The distributed application 129A may be loaded with logic or code, including conditional statements for enabling the distribution of rendering and/or processing of the media content 123 between multiple devices 102 and 104 located at the premise 106. For example, the distributed application 129A may be an executable smart contract written as code with a series of conditional statements. The distributed application 129A may be pre-installed on the end user device 102 or installed at the end user device 102 upon an event (e.g., being instantiated into the carrier network 108 or requesting media content 123 from the server 113).

In an embodiment, the end user device 102 may be a lightweight, handheld, or portable device that operates on battery power and includes limited processing and rendering capabilities. For example, the end user device 102 as referred to herein may be a mobile phone, a wearable device, or a tablet device, each having a display but with limited battery, processing, and rendering power.

The rendering device 104 may be a computing device, such as the computing device described below with reference to FIG. 7, with more powerful hardware and software resources relative to the end user device 102. In some cases, the rendering devices 104 may be connected to a constant power supply, or have a much greater battery power than that of the end user device 102. For example, the rendering device 104 may include one or more devices that receive electric power from alternating current (AC) power mains. However, the rendering device 104 may, in some cases, not include a display, a media player, or even speakers. In this way, the rendering device 104 may be a device on the premise 106 that may not be necessarily used by the user for streaming media, but may instead be a server located on the premise 106 with powerful processing and rendering capabilities. Other end user devices 102 on the premise 106 may take advantage of the resources at the rendering device 104 to perform various processing and rendering tasks on behalf of the end user device 102.

The rendering device 104 may be one or more servers, a computer box, personal computer, laptop, or even a handheld device, such as a mobile phone or tablet, with processing, storage, and network transmission capabilities. The rendering device may include a graphics processing unit (GPU) 132, a CPU 133, and one or more APIs 134. The GPU 132 may be specialized processor used for graphics and video rendering in high fidelity, and may be efficient at manipulating computer graphics and image processing. The CPU 133 may be a central processor of the rendering device 104. The APIs 134 may be interfaces by which the rendering device 104 may communicate with the end user device 102, MEC server 107, carrier network 108, storage system 111, and server 113. The rendering device 104 and the end user device 102 may be registered with the carrier network 108 under the same customer account associated with the end user.

Similar to the end user device 102, the rendering device 104 may also include an instruction manager application 126B and one or more distributed applications 129B. The rendering device 104 may also include a rendering application 136, which operates with the GPU 132 to render the media content 123. Media content 123 is rendered when the raw or coded data and files related to the media content 123 is converted to a format required for display or printing. Rendering may be performed using different types of algorithms or modeling techniques, such as, for example, rasterization, ray casting, ray tracing, radiosity, etc.

The end user device 102 and the rendering device 104 may be communicatively coupled together via a wired or wireless link. When the link is wireless, the end user device 102 and the rendering device 104 may communicate with one another using various wireless communication protocols or connections, such as, for example, a Wi-Fi connection, a WLAN connection, a BLUETOOTH connection, a NFC connection, an ultra-wide band connection, etc.

It should be appreciated that the end user device 102 and the rendering device 104 may include other hardware and software components not otherwise shown in FIG. 1 or described herein. For example, in some embodiments, the end user device 102 may also include a rendering application 136 and/or a GPU 132.

The MEC server 107 (also referred to as a "far edge computing server") may be a computing device that extends the capabilities of cloud computing by bringing the services to the edge of the network 117. For example, the MEC server 107 may be one or more servers, a computer box, personal computer, laptop, or even a handheld device, such as a mobile phone or tablet, with processing, storage, and network transmission capabilities. The MEC server 107 may be positioned anywhere in the system 100 between the network 117 and the premise 106. Additional details regarding the MEC server 107 is described in the '937 patent application.

The cell site 114 provides the end user device 102, the rendering device 104, and/or the MEC server 107 a wireless communication link to the carrier network 108, network 117, storage system 111, and server 113 according to a 5G, a long term evolution (LTE), a code division multiple access (CDMA), or a global system for mobile communications (GSM) wireless telecommunication protocol. The network 117 may be one or more private networks, one or more public networks, or a combination thereof. While FIG. 1 shows the carrier network 108, storage system 111, and server 113 as being separate from the network 117, it should be appreciated that, in some embodiments, at least a portion of the carrier network 108, storage system 111, and server 113 may be part of the network 117.

The carrier network 108 may be a network including a radio access network (RAN) and a core network 141. The RAN may include the access network containing the radio elements of a cell network, and the core network 141 may include the elements that manage the subscriber information, call setup and routing, and related system supports. In an embodiment, the core network 141 may be an evolved packet core (EPC) network. The core network 141 may be a configured to implement a 5G, a LTE, a CDMA, or a GSM wireless telecommunication protocol. In one embodiment, the core network 141 may be a 3rd Generation Partnership Project (3GPP) Evolved Packet System (EPS).

The core network 141 may store subscriber data related to one or more end users operating one or more end user devices 102 and rendering devices 104. The subscriber data may include, for example, subscription plans 143 and device capabilities 146 related to one or more end user devices 102 and/or rendering devices 104 that have been registered with the carrier network 108. A subscription plan 143 may be an agreement between an end user and a carrier network provider, according to which the carrier network provider agrees to provide one or more devices 102 and 104 belonging to the end user a set of services under the terms of the subscription plan 143. The end user receives the right to use the services and agrees to pay for these services per the agreement. The device capabilities 146 indicate capabilities of the end user devices 102 and the rendering devices 104 belonging to the end user. For example, the device capabilities 146 may indicate the power reserve of the end user device 102 and rendering device 104, the processing resources at the end user device 102 and rendering device 104, the rendering resources at the end user device 102 and rendering device 104, whether the end user device 102 and/or rendering device 104 include a GPU 132, the display resolutions that the end user device 102 is capable of displaying, the type of media players 118 installed at the end user device 102, the screen size of the end user device 102, the type of speaker at the end user device 102, etc. The one or more APIs 149 may each be an interface by which a network element in the carrier network 108 communicates with the end user device 102, rendering device 104, MEC server 107, storage system 111, and server 113.

While FIG. 1 shows the core network 141 as storing subscription plans 143 and device capabilities 146, it should be appreciated that the core network 141 also includes other data and applications not otherwise shown in FIG. 1. For example, the subscription plans 143 and device capabilities 146 may be stored in association with an AMF or SMF of the core network 141.

The storage system 111 may be a decentralized file system, such as, for example, an interplanetary file system (IPFS). For example, the storage system 111 may be located at one or more data centers and implemented as a cloud data storage. The storage system 111 may comprise multiple servers and memories (e.g., databases and data stores), often distributed over multiple locations, with each location being a data center. The storage system 111 may be owned and operated by a host, and may offer a pay-as-you-go model, in which users pay for storage and processing resources as they are used, which can help reduce capital expenses for operations.

The storage system 111 may store media content 123 in a distributed manner in the form of multiple media packages 150A-N across multiple database nodes 153A-N (also referred to herein as simply "databases 153A-N"), respectively. To this end, FIG. 1 shows the storage system 111 as including multiple database nodes 153A-N, which may each be a server node comprising memories for data storage. In some cases, each database node 153A-N may have a maximum storage capacity or may enforce a maximum file size or package size permitted for each file or package stored at the database node 153A-N. As shown in FIG. 1, each database node 153A-N stores a respective media package 150A-N. The database nodes 153A-N together storing the media packages 150A-N may be implemented as an IPFS cluster, or each of the database nodes 153A-N may be implemented as an IPFS cluster.

In some cases, as described in the '937 patent application, the MEC server 107 may also store one or more of the media packages 150A-N. For example, the MEC server 107 may request one or more media packages 150A-N from the storage system 111 or the server 113 based on a request from an end user device 102 proximate to and/or served by the MEC server 107. Alternatively, the MEC server 107 may receive one or more media packages 150A-N from the storage system 111 based on expected consumption patterns of the end user device 102 proximate to and/or served by the MEC server 107.

The server 113 may be a server with processing, storage, and network transmission capabilities, which is coupled to the storage system 111 by the link 170, which may be a wired or wireless link. The server 113 may include a packaging application 156, a ledger application 159, a ledger 161, and one or more APIs 166. The packaging application 156 may receive media content 123, which has been published by a content producer or publisher. The packaging application 156 may then segment the media content 123 (i.e., the data and files that constitute the media content 123) into the multiple different media packages 150A-N, in which N may be any integer greater than 1. For example, the media content 123 may be divided or segmented based on a maximum size of data permitted to be stored at each database node 153A-N in the storage system 111. For example, when each database node 153A-N in the storage system 111 is permitted to store a package having a maximum of 256 kilobytes (KB) of data, then the media content 123 may be segmented into multiple media packages 150A-N, each being less than or equal to 256 KB in size. The packaging application 156 may then transmit the media packages 150A-N to the storage system 111 for storage across the database nodes 153A-N in a distributed manner. The storage system 111 may store the different media packages 150A-N across the different database nodes 153A-N. As should be appreciated, the server 113 may include other components, applications, and data other than the packaging application 156, the ledger application 159, and the APIs 166.

In an embodiment, the packaging application 156 may also communicate with the core network 141 to determine the device capabilities 146 and/or subscription plans 143 associated with the devices 102 and 104 belonging to a customer and located at the premise 106. For example, the packaging application 156 may request the device capabilities 146 and/or subscription plans 143 associated with the devices 102 and 104 after determining that media content 123 is to be transmitted to the end user device 102. The packaging application 156 may determine that media content 123 is to be transmitted to the end user device 102 in various manners. For example, in some cases, the end user device 102 may transmit a request to the server 113 for the media content 123 in a form that has not yet been rendered. In this case, the packaging application 156 may then be triggered to obtain the device capabilities 146 and/or subscription plans 143 associated with the devices 102 and 104 from the core network 141. Alternatively, the server 113 may be intelligently trained to send customer devices 102 and 104 media content 123 based on past customer consumption patterns or expected customer consumption patterns. In this case, the packaging application 156 may obtain the device capabilities 146 and/or subscription plans 143 associated with the devices 102 and 104 from the core network 141 at the time when the server 113 determines that such media content 123 should be sent to the end user device 102.

The packaging application 156 may then determine an optimal rendering distribution scheme between the end user device 102 and rendering device 104 located at the customer premise 106 based on the device capabilities 146 and/or subscription plans 143. For example, the packaging application 156 may determine which rendering and processing tasks the end user device 102 should perform to generate a final render of the media content 123 based on content 177. The content 177 refers to the media content 123 in a raw data form, prior to rendering being performed on the media files, libraries, APIs, and other data included in the media packages 150A-N). Similarly, the packaging application 156 may determine which rendering and processing tasks the rendering device 104 should perform to generate the final render of the media content 123.

The packaging application 156 may generate one or more instruction sets 165 with logic or code instructing the different devices 102 and 104 to perform the different rendering and processing tasks to generate the final render of the media content 123 based on the content 177. The instruction sets 165 may be sets of logic or code which, when executed, causes a device 102 or 104 to perform certain processing or rendering tasks for the media content 123. For example, an instruction set 165 may include conditional statements, or if/then clauses, that when executed enable the distribution of rendering and processing of the media content 123 between multiple devices 102 and 104 located at the premise 106. For example, the instruction set 165 may be an executable smart contract written as code with a series of conditional statements.

In an embodiment, the packaging application 156, or an application external to the server 113, may generate the distributed applications 129A-B based on the instruction sets 165 determined for the optimal distributed rendering scheme. For example, the packaging application 156 may generate a distributed application 129A for the end user device 102 with instructions for performing the rendering and processing tasks, allocated to the end user device 102, to generate the final render of the media content 123 based on the content 177. Similarly, the packaging application 156 may generate another distributed application 129B for the rendering device 104 with instructions for performing the rendering and processing tasks, allocated to the rendering device 104, to generate the final render of the media content 123 based on the content 177. In an embodiment, the packaging application 156 may respectively transmit the distributed applications 129A-B to the end user device 102 and the rendering device 104 for local installation.

The ledger application 159 may be executed during the segmenting of the media content 123 by the packaging application 156, before the segmenting, or after the segmenting, to generate a ledger 161 describing details regarding the media content 123 and the media packages 150A-N. The ledger 161 may be a manifest or any other type of ledger, for example, generated using a distributed ledger technology (DLT) protocol. The ledger 161 may be encoded as a blockchain or any other data structure. In some embodiments, the ledger 161 may comprise parameters 163 and/or the instruction sets 165, and may include various fields representing different parameters 163 and/or the instruction sets 165.

The parameters 163 may be data related to the successful transmission and reassembly of the packages. In some embodiments, the parameters 163 may indicate how to fetch the media packages 150A-N from the storage system 111, reassemble the media packages 150A-N into the requested media content 123, decrypt the media packages 150A-N, decompress the media packages 150A-N using one or more tokenization methods, charge or pay for the requested media content 123, and any other data related to the packages. For example, one of the blocks or fields in the ledger 161 may indicate the compression or tokenization scheme used to compress the data in each of the media packages 150A-N, an order of the media packages 150A-N and a location of each of the media packages (i.e., an address of the respective database node 153A-N) storing a respective media package 150A-N, or analytical data regarding, for example, a history of consumption of the media content 123 by one or more end user devices 102, etc. In an embodiment, the ledger application 159 may generate multiple ledgers 161 for different end user devices 102 and/or rendering devices 104, each ledger 161 including a different parameters 163 and/or instruction sets 165.

In an embodiment, the parameters 163 may include one or more flags or bits indicating whether one or more instruction sets 165 are included in the ledger 161. The parameters 163 may also include an indication of the types or functions of the instruction sets 165 included in the ledger 161. For example, one of the flags or bits may indicate whether the media content 123 being referenced by the ledger 161 is to be rendered in a distributed manner according to one or more instruction sets 165 in the ledger 161. For example, a dedicated parameter 163 in the ledger 161 may be set to 1 when the media content 123 is being transmitted to the end user device 102, prior to the actual rendering of the media content 123, and when the rendering of the media content 123 should be distributed or split between multiple devices 102 and 104 at the premise 106.

For example, the ledger 161 may be in the form of a blockchain, with each block in the blockchain carrying one of the different parameters 163, and one or more blocks in the blockchain carrying a different instruction set 165. For example, a first quantity of blocks in the blockchain may be dedicated to carrying the parameters 163 and a second quantity of blocks in the blockchain may be dedicated to carrying instruction sets 165. The one or more APIs 166 may each be an interface by which the server 113 may communicate with the storage system 111, the carrier network 108, the MEC server 107, and the end user device 102.

In some cases, as described in the '937 patent application, the MEC server 107 may also store ledgers 161 associated with different media packages 150A-N. For example, the MEC server 107 may receive, from the server 113 or the storage system 111, the ledger 161 with the corresponding media package 150A-N. Alternatively, the MEC server 107 may receive the ledger 161 first, and then subsequently request the corresponding media packages 150A-N from the server 113 or the storage system 111.

As an illustrative example, the end user device 102 may transmit a request to the server 113 for the media content 123. The packaging application 156 may then obtain device capabilities 146 and/or subscription plans 143 associated with the devices 102 and 104 registered with the customer in the carrier network 108, and identify the devices 102 and 104 located at the customer premise 106. The packaging application 156 may then generate the instruction sets 165 for optimizing distribution of rendering among the devices 102 and 104 in the premise 106. The ledger application 159 may also generate the ledger 161 including the parameters 163 and instruction sets 165 at this point.

In an embodiment, the packaging application 156 may then transmit a package 175 comprising the content 177 and the ledger 161 to at least one of the end user device 102 or the rendering device 104. Alternatively, the packaging application 156 may transmit the package 175 to the MEC server 107, such that the MEC server 107 may forward the package 175 to end user device 102 and/or rendering device 104 upon request. The content 177 may include the media content 123 in raw data form, for example, in the form of the media packages 150A-N, and rendering operations may not yet have been performed on the content 177. The ledger 161 may include the parameters 163 and/or the instruction sets 165, depending on the embodiment. In the first embodiment, the ledger 161 includes the instruction sets 165, and instruction manager applications 126A-B at the end user device 102 and the rendering device 104 run the instruction sets 165 in the ledger 161 to distribute rendering of the content 177 between the end user device 102 and the rendering device 104, as further described below in method 300 of FIG. 3. In the second embodiment, the packaging application 156 may transmit the instruction sets 165 in the form of the distributed applications 129A-B to the end user device 102 and the rendering device 104, as further described below in method 300 of FIG. 4.

While FIG. 1 shows the storage system 111 and the server 113 as being separate from each other but coupled together via a communication link 170, it should be appreciated that in other embodiments, the storage system 111 and the server 113 may be positioned together across the same servers in a data center, for example. While FIG. 1 shows the storage system 111 and the server 113 as being separate from the carrier network 108, it should be appreciated that in other embodiments, the storage system 111 and the server 113 may be part of the carrier network 108.

Figure 2:
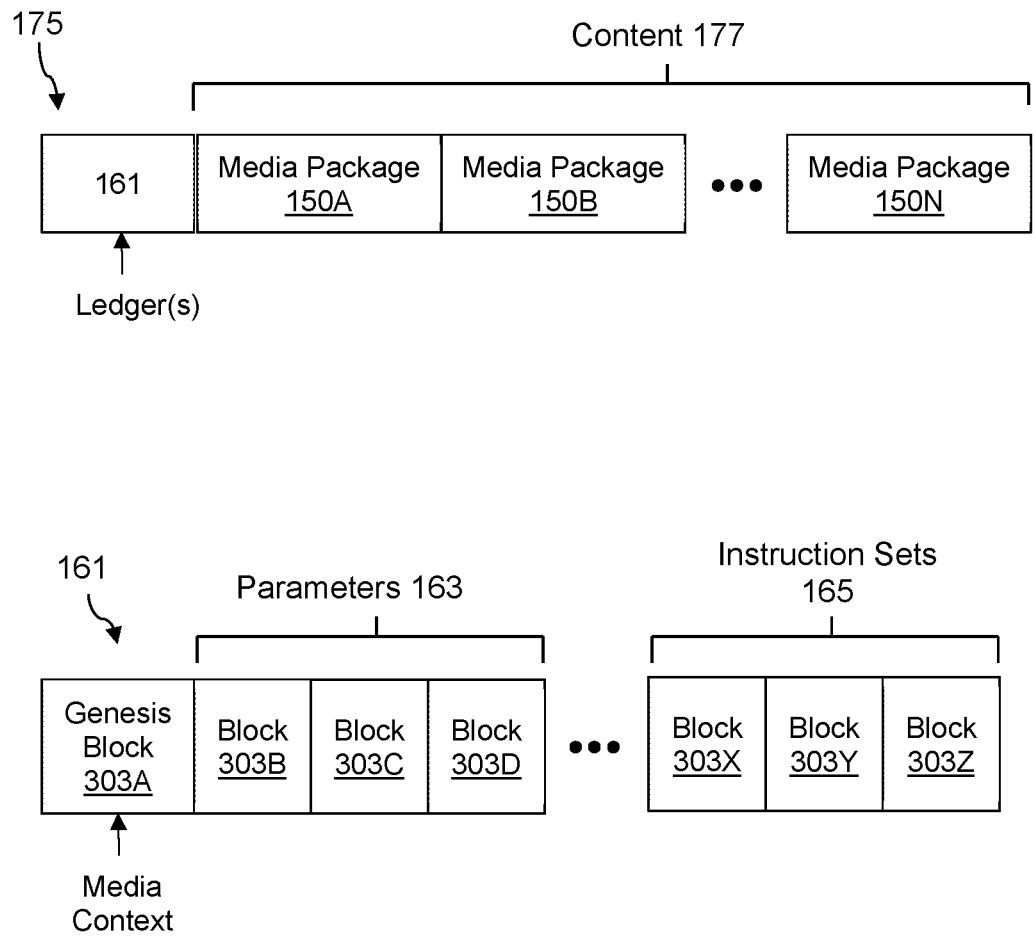
FIG. 2 is a block diagram illustrating a package transmitted in the communication system of FIG. 1 according to an embodiment of the disclosure.

Turning to FIG. 2, shown is a block diagram illustrating an example of a package 175 including a ledger 161 and the content 177. The content 177 may comprise corresponding media packages 150A-N related to media content 123, which may have been requested by an end user device 102. The package 175 may be sent from the server 113, storage system 111, or MEC server 107 to one or more devices located at the customer premise 106 (i.e., the end user device 102 and/or the rendering device 104).

In an embodiment, the package 175 includes one or more ledgers 161 associated with the media content 123 and the content 177 (i.e., media packages 150A-N including the data and files for rendering the media content 123). In an embodiment, the ledgers 161 may be specifically generated for one or both of the devices 102 and 104 in a customer premise 106. The one or more ledgers 161 may be carried in the package 175 as a preamble. In the embodiment shown in FIG. 2, the one or more ledgers 161 may be transmitted with the media packages 150A-N to the devices 102 and/or 104. However, another embodiment encompasses the scenario in which the ledgers 161 are first sent down to the devices 102 and/or 104 alone, and then the data in the ledgers 161 may be used by the devices 102 and/or 104 to subsequently fetch the media packages 150A-N from the storage system 111, server 113, or MEC server 107.

In the example shown in FIG. 2, the one or more ledgers 161 may be encoded as a blockchain. FIG. 2 illustrates examples of various blocks 303A-Z within an example ledger 161 encoded as a blockchain. For example, a first set of blocks in the blockchain or ledger 161 may carry parameters 163, a hash of the data in the block, a hash of the previous block in the blockchain, and/or any other data. The first block 303A in the example ledger 161 is referred to as a genesis block 303A, which may carry the media context of the media content 123. For example, the genesis block 303A may indicate the name of the media content 123 and locations of one or more of the media packages 150A-N of the media content 123. The second block 303B may carry a parameter 163, such as, for example, a responsible party profile and authentication, authorization, and accounting (AAA) information. For example, the second block 303B may indicate whether the media packages 150A-N are capable of being delivered, whether the devices 102 and/or 104 are authorized to receive the media packages 150A-N, etc. The ledger application 159 may determine information such as whether the end user device 102 and/or rendering device 104 is authorized to receive the media packages 150A-N by communicating with the core network 141 to receive the subscription plans 143 and device capabilities 146 of the end user device 102. The ledger application 159 may then add this information to block 303B in the ledger 161.

The third block 303C may carry another parameter 163, such as, for example, one or more flags indicating whether an instruction set 165 is included in the ledger 161 and/or an indication of the types or functions of the instruction sets 165 included in the ledger 161. The packaging application 156 may communicate with the core network 141 to determine whether rendering should be distributed among multiple devices 102 and 104 at the customer premise 106, and then generate the instruction sets 165 accordingly to optimize distribution of rendering tasks among the devices 102 and 104. The ledger application 159 may receive an indication that one or more distribution related instruction sets 165 should be included in the ledger 161 from the packaging application 156. The ledger application 159 may add this indication to the block 303C.

The fourth block 303D may carry any other parameter 163 describing the devices 102 and/or 104. For example, the parameters 163 describing the devices 102 and 104 may indicate the device capabilities 146 of the devices 102 and 104 and the formats of data that are permitted to be delivered to the devices 102 and 104. The ledger application 159 may obtain the device capabilities 146 regarding the devices 102 and 104 from the core network 141. The ledger application 159 may add the device capabilities 146 to the block 303D.

The different blocks 303B-D may carry any type of parameter 163. For example, the parameter 163 may include network profile information regarding one or more network characteristics in the communication system 100, locations of the media packages 150A-N in the storage system 111, data regarding compression and/or tokenization schemes used on the media packages 150A-N to compress the data in each of the media packages 150A-N, methods of reassembling and rendering the media packages 150A-N to generate a final render of the media content 123. The network characteristics may include, for example, backhaul signal strength, bandwidth (e.g., frequency bands), latency, throughput, jitter, packet loss, supported wireless technologies, types of devices communicating with the network element, antenna patterns, etc. The method of reassembling and rendering the media packages 150A-N may include instructions regarding how to rebuild the layers and/or pixels in each frame of the media content 123 based on the data and files in the media packages 150A-N and/or the correct sequence of the media packages 150A-N, such that end user device 102 may stitch together the media content 123 in the accurate sequence. Other example parameters 163 carried in the ledger 161 may include encryption data indicating encryption schemes performed on the media packages 150A-N, analytics functions and data, such as consumption data of the media content 123 by end user devices 102, settlement functions and data, and/or other implementation elements.

As shown in FIG. 2, a second set of blocks in the blockchain or ledger 161 may carry instruction sets 165, a hash of the data in the block, a hash of the previous block in the blockchain, and/or any other data. As mentioned above, the packaging application 156 may generate the instruction sets 165 based on device capabilities 146 and/or subscription plans 143 of the devices 102 and 104 located at a customer premise 106. The ledger application 159 may receive the instruction sets 165 from the packaging application 156 and add the instruction sets 165 to each of blocks 303X, 303Y, and 303Z.

As should be appreciated, the ledger 161 may include any number of blocks carrying any type of parameter 163 related to the transmission and rendering of the media content 123 using the media packages 150A-N, and any type of instruction set 165. The instruction sets 165 included in the ledger 161 should not be limited to include only the instruction sets 165 related to the distribution of processing and rendering across the devices 102 and 104 at the customer premise 106. Instead, it should be appreciated that the ledger 161 may include several other types of instruction sets 165 as well.

Figure 3:
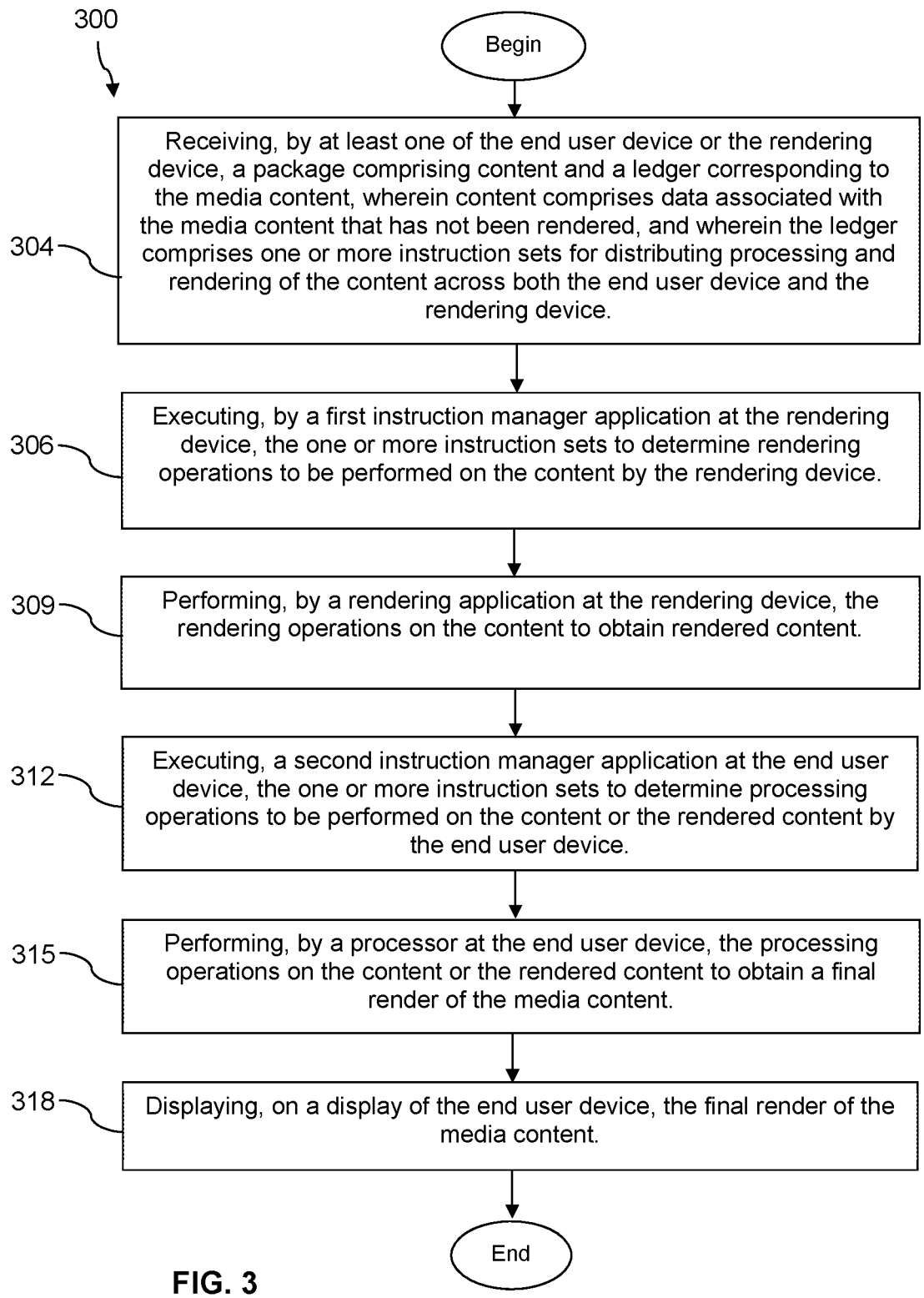
FIG. 3 is a flowchart of a first method according to an embodiment of the disclosure.

Turning now to FIG. 3, a method 300 is described. In an embodiment, the method may be performed by the end user device 102 and the rendering device 104 located at the customer premise 106. The method 300 may be performed after media content 123 has been published to the storage system 111 in the form of media packages 150A-N. The method 300 may also be performed after the server 113 or the MEC 107 determines that a package 175 include the content 177 and a ledger 161 should be sent down to the devices 102 and 104 located at a customer premise 106. The server 113 or the MEC 107 may make this determination based on a request for the media content 123 received from the end user device 102, or based on a determination that the customer located at the premise 106 may likely request the media content 123 soon according to, for example, a consumption history of the customer.

The packaging application 156 at the server 113 may communicate with the core network 141 to obtain the device capabilities 146 of the devices 102 and 104 located at the customer premise 106. The packaging application 156 may then determine an optimal distribution of rendering and/or processing between the devices 102 and 104 at the customer premise 106, and then generate instruction sets 165 accordingly. The ledger application 159 may receive the instruction sets 165 from the packaging application 156, and include the instruction sets 165 in the ledger 161 corresponding to the media content 123. Each of the instruction sets 165 may be carried in a different field or block of the ledger 161. The ledger 161 may also carry parameters 163 used to assemble and render the media content 123 at the devices 102 and 104.

At step 304, method 300 comprises receiving, by at least one of the end user device 102 or the rendering device 104, a package 175 comprising the content 177 and the ledger 161 corresponding to the media content 123. In an embodiment, the ledger 161 comprises one or more instruction sets 165 for distributing processing and rendering of the content 177 across both the end user device 102 and the rendering device 104 located at the customer premise 106.

At step 306, method 300 comprises executing, by a first instruction manager application 126B at the rendering device 104, the one or more instruction sets 165 to determine rendering operations to be performed on the content 177 by the rendering device 104. For example, the rendering operations may include performing the shading, texture-mapping, bump-mapping, fogging/participating medium, shadows, soft shadows, reflections, transparencies (optics or graphics), opacity, translucency, refraction, diffraction indirect illumination, caustics, depth of field, motion blur, non-photorealistic rendering, and other image rendering operations on one or more images of the media content 123. These operations are process intensive and require a heavy amount of GPU and CPU resources for proper execution, and thus, may be more effectively performed by the rendering device 104 as opposed to the lightweight end user device 102. At step 309, method 300 comprises performing, by the rendering application 136 at the rendering device 104, the rendering operations on the content 177 to obtain rendered content.

At step 312, method 300 comprises executing, a second instruction manager application 126A at the end user device 102, the one or more instruction sets 165 to determine processing operations to be performed on the content 177 or the rendered content (obtained at step 309) by the end user device 102. For example, the processing operations may involve encryption, decryption, compression, decompression, reassembling the data, and/or any other processing operation, to generate the final render of the media content 123. At step 315, method 300 comprises performing, by a processor at the end user device 102, the processing operations on the content 177 or the rendered content (obtained at step 309) to obtain a final render of the media content 123. At step 318, method 300 comprises displaying, on a display 115 of the end user device 102, the final render of the media content 123.

Method 300 may include other steps or attributes not otherwise shown and described in FIG. 3. For example, in method 300, the content 177 comprises raw data related to the media content 123 and may be in the form of media packages 150A-N, the ledger 161 may further comprise a flag indicating that rendering and processing of the content 177 is to be distributed across both the end user device 102 and the rendering device 104, the one or more instruction sets 165 may comprise a set of conditional statements, which, when executed, allocate the rendering operations to the rendering device 104 and the processing operations to the end user device 102 for execution, the package 175 may be received by at least one of the end user device 102 or the rendering device 104 in response to transmitting, by the end user device 102, a request for the media content 123 to a server 113 coupled to a storage system 111 storing the content 177, and the rendering device 104 may be coupled to a power source, such as AC power mains. In an embodiment, method 300 further comprises transmitting, by the rendering device 104, the rendered content to the end user device 102, and integrating, by the end user device 102, the rendered content with data obtained from performed the processing operations on the content 177 to obtain the final render of the media content 123. The end user device 103 may perform the integrating based on the parameters 163 and/or instruction sets 165 received in the ledger 161, either of which may indicate how to reassemble the rendered content into the final render of the media content 123.

Figure 4:
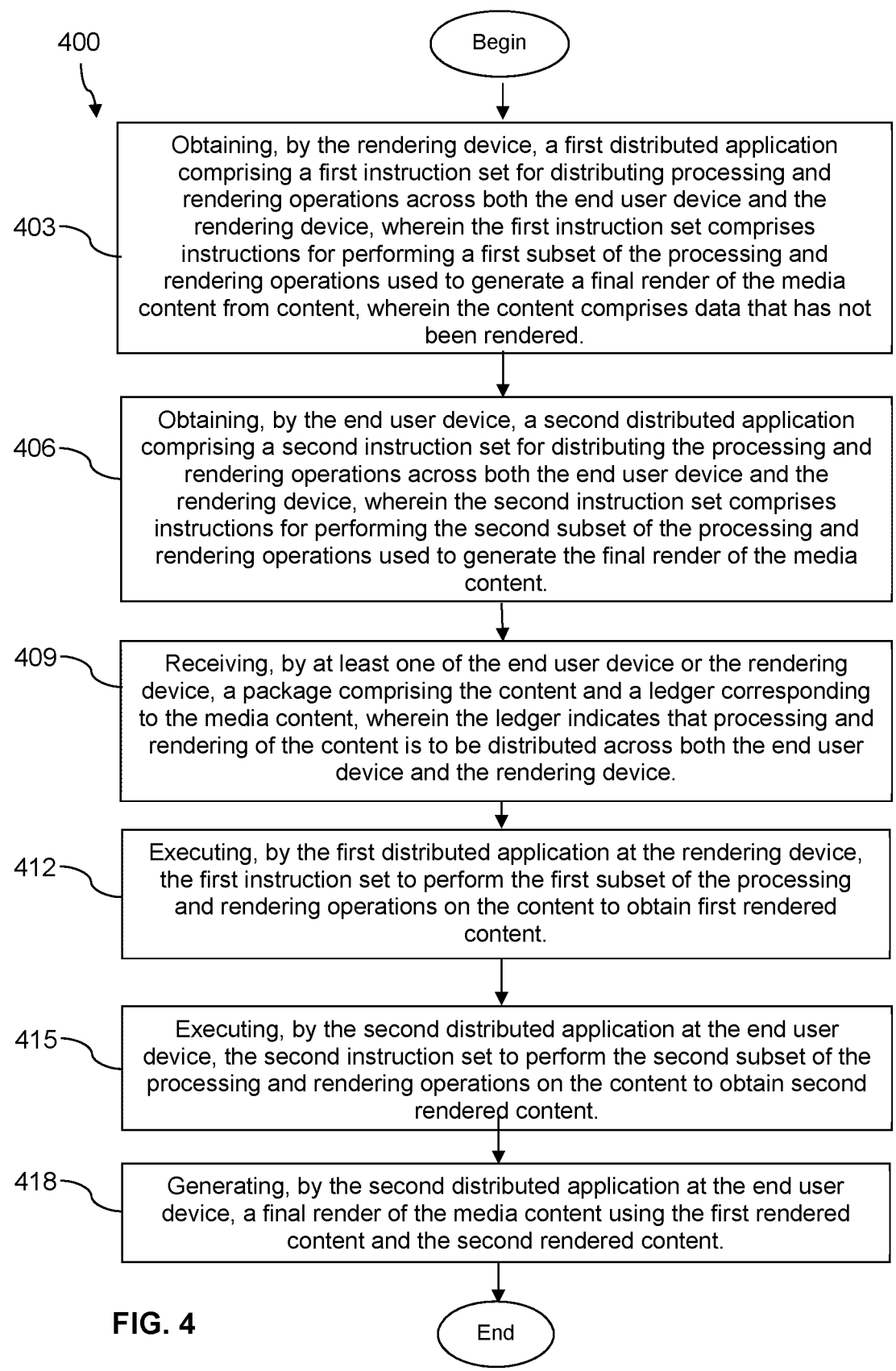
FIG. 4 is a flowchart of a second method according to an embodiment of the disclosure.

Turning now to FIG. 4, a method 400 is described. In an embodiment, the method may be performed by the end user device 102 and the rendering device 104 located at the customer premise 106. Similar to method 300 of FIG. 3, the method 400 may be performed after media content 123 has been published to the storage system 111 in the form of media packages 150A-N. The method 400 may also be performed after the server 113 or the MEC 107 determines that a package 175 including content 177 and a ledger 161 should be sent down to the devices 102 and 104 located at a customer premise 106.

Again, similar to method 300 of FIG. 3, the packaging application 156 at the server 113 may communicate with the core network 141 to obtain the device capabilities 146 of the devices 102 and 104 located at the customer premise 106. The packaging application 156 may then determine an optimal distribution of rendering between the devices 102 and 104 at the customer premise 106, and then generate instruction sets 165 accordingly. Unlike method 300 of FIG. 3, the method 400 of FIG. 4 may involve sending the instruction sets 165 downstream to the devices 102 and 104 for installation at the devices 102 and 104 in the form of distributed applications 129A-B, rather than solely including the instruction sets 165 with the ledger 161 sent in the package 175.

At step 403, method 400 comprises obtaining, by the rendering device 104, a first distributed application 129B comprising a first instruction set 165 for distributing processing and rendering operations across both the end user device 102 and the rendering device 104. In an embodiment, the first instruction set 165 may comprise instructions, or code, for performing a first subset of the processing and rendering operations used to generate a final render of the media content 123 from content 177.

At step 406, method 400 comprises obtaining, by the end user device 102, a second distributed application 129A comprising a second instruction set 165 for distributing the processing and rendering operations across both the end user device 102 and the rendering device 104. In an embodiment, the second instruction set 165 may comprise instructions, or code, for performing a second subset of the processing and rendering operations used to generate the final render of the media content 123.

At step 409, method 400 comprises receiving, by at least one of the end user device 102 or the rendering device 104, a package 175 comprising the content 177 and a ledger 161 corresponding to the media content 123. In an embodiment, the ledger 161 indicates that processing and rendering of the content 177 is to be distributed across both the end user device 102 and the rendering device 104. For example, such an indication may be carried in block 303C of the ledger, as described above with reference to FIG. 2. In an embodiment, an identifier of the end user device 102 and the rendering device 104 across which to distribute rendering may be indicated in the ledger 161, for example, in a parameter 163.

At step 412, method 400 comprises executing, by the first distributed application 129B at the rendering device 104, the first instruction set 165 to perform the first subset of the processing and rendering operations on the content 177 to obtain first rendered content. At step 415, method 400 comprises executing, by the second distributed application 129A at the end user device 102, the second instruction set 165 to perform the second subset of the processing and rendering operations on the content 177 to obtain second rendered content. At step 418, method 400 comprises generating, by the second distributed application 129A at the end user device 102, a final render of the media content 123 using the first rendered content and the second rendered content. For example, the second distributed application 129 may determine how to integrate, or reassemble, the first rendered content and the second rendered content together to create the final render of the media content 123 based on parameters 163 or instructions carried in the ledger 161.

Method 400 may include other steps or attributes not otherwise shown and described in FIG. 4. For example, the first distributed application 129B may be received by the rendering device 104 from a packaging application 156 at the server 113 based on capabilities of the rendering device 104, and the second distributed application 129 may be received by the end user device 102 from the packaging application 156 based on capabilities of the end user device 102. In an embodiment, the first distributed application 129B may be received by the rendering device 104 and the second distributed application 129A may be received by the end user device 102 in response to transmitting, by the end user device 102, a request for the media content 123, or the first distributed application 129B is received by the rendering device 104 and the second distributed application 129A is received by the end user device 102 in response to the end user device 102 and the rendering device 104 initially connecting to a carrier network 108. In an embodiment, the first instruction set 165 of the first distributed application 129B and the second instruction set 165 of the second distributed application 129A comprise a set of conditional statements, which, when executed, allocate the first subset of the processing and rendering operations to the rendering device 104 and the second subset of the processing and rendering operations to the end user device 102 for execution. In an embodiment, method 400 further comprises transmitting, by the rendering device 102, the first rendered content to the end user device 103, and integrating, by the end user device 102, the first rendered content with the second rendered content to obtain the final render of the media content 123. In an embodiment, the rendering device 104 is coupled to a power source.

Figure 5:
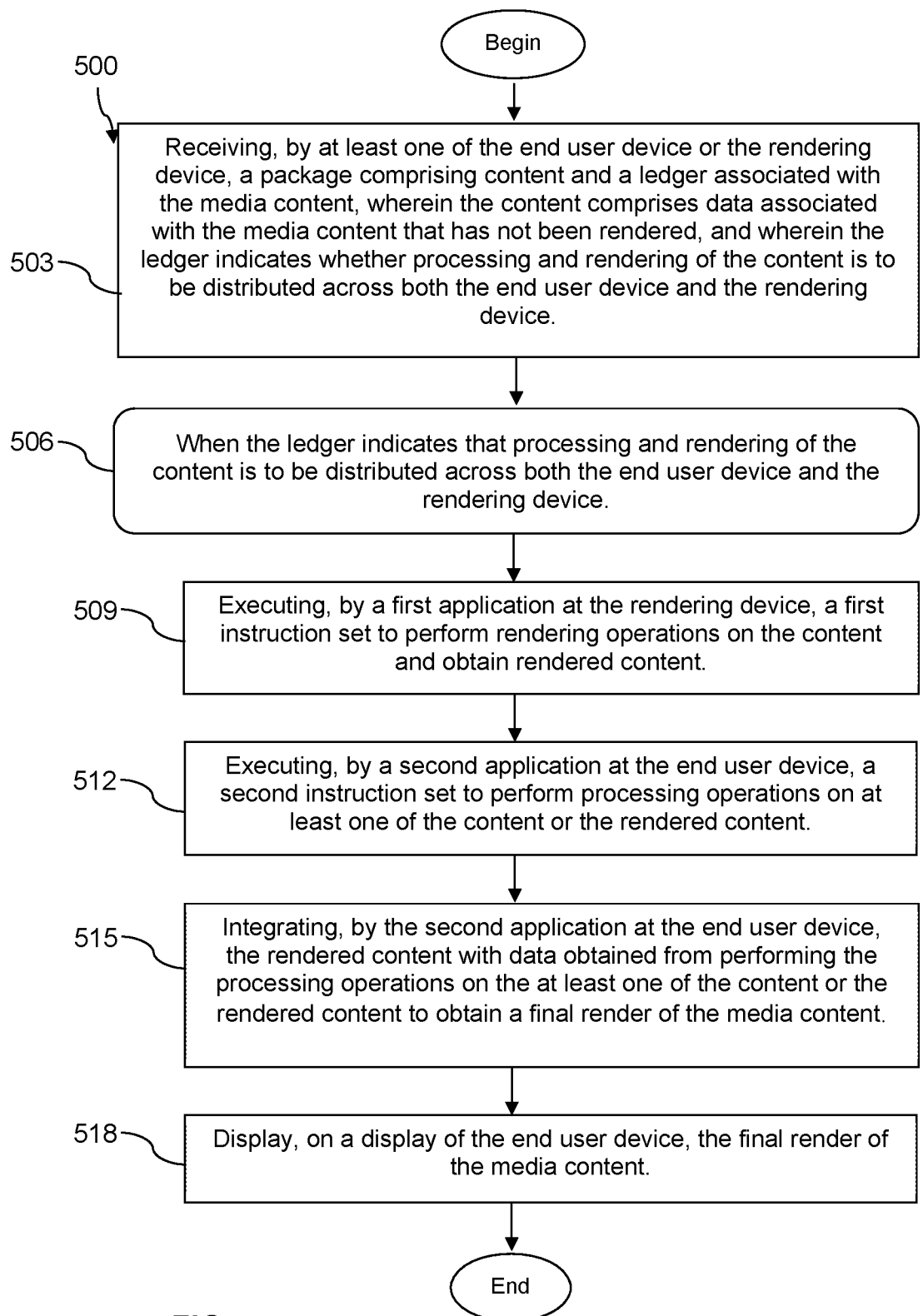
FIG. 5 is a flowchart of a third method according to an embodiment of the disclosure.

Referring next to FIG. 5, shown is method 500. Method 500 is similar to methods 400 and 300, in that method 500 may be performed after media content 123 has been published to the storage system 111 in the form of media packages 150A-N and after the server 113 or the MEC 107 determines that a package 175 corresponding to the media content 123 should be sent down to the devices 102 and 104 located at a customer premise 106. Method 500 may also be performed after the packaging application 156 generates one or more instruction sets 165 based on the device capabilities 146 of the devices 102 and 104 located at the customer premise 106.

At step 503, method 500 comprises receiving, by at least one of the end user device 102 or the rendering device 104, a package 175 comprising content 177 and a ledger 161 associated with the media content 123. In an embodiment, the ledger 161 may indicate whether processing and rendering of the content 177 is to be distributed across both the end user device 102 and the rendering device 104.

At step 506, method 500 comprises determining whether the ledger 161 indicates that processing and rendering of the content 177 is to be distributed across both the end user device 102 and the rendering device 104. If so, method 500 proceeds to step 509, which comprises executing, by a first application at the rendering device 104, a first instruction set 165 to perform rendering operations on the content 177 and obtain rendered content. The first application may be the instruction manager application 126B or the distributed application 129B. At step 512, method 500 comprises executing, by a second application at the end user device 102, a second instruction set 165 to perform processing operations on at least one of the content 177 or the rendered content generated at step 509. The second application may be the instruction manager application 126A or the distributed application 129A.

At step 515, method 500 comprises integrating, by the second application at the end user device 102, the rendered content with data obtained from performing the processing operations on the at least one of the content 177 or the rendered content to obtain a final render of the media content 123. For example, the integrating may be performed in accordance with reassembly instructions carried in the ledger 161, indicating how the integration between the rendered content generated at step 513 and the data obtained from performing the processing operations on the at least one of the content 177 or the rendered content is to be performed. At step 518, method 500 comprising displaying, on a display 115 of the end user device 102, the final render of the media content 123.

Method 500 may include other steps or attributes not otherwise shown and described in FIG. 5. In an embodiment, the ledger 161 may comprise the first instruction set 165 and the second instruction set 165. In another embodiment, the first application is a first distributed application 129B comprising the first instruction set 165, and the second application is a second distributed application 129A comprising the second instruction set 165. The first instruction set 165 and the second instruction set 165 may each comprise a set of conditional statements, which, when executed, allocate the rendering operations to the rendering device 104 and the processing operations to the end user device 102 for execution. In an embodiment, the package 175 may be received by at least one of the end user device 102 or the rendering device 104 in response to transmitting, by the end user device 102, a request for the media content 123 to a server 113 coupled to a storage system 111 storing the content 177.

As an example, a primary manifest (e.g., at least a portion of the ledger 161) may have other links pointing to each media manifest (e.g., blocks in the ledger 161). The primary manifest may be the first file that is requested by a player at the end user device when media content 123, or video, playback begins. This file may list all of the available streaming versions of the video that are available, for example, at the storage system 111. This file generally includes 2 lines per version: the first line of the manifest entry may indicate some stream of information (i.e., bandwidth requirement, video resolution, codec descriptions so a player may find a compatible version for the browser), and the second line of the manifest entry may be a link to where the version of the video can be found at the storage system 111, for example. The video player at the end user device 102 may use the primary playlist to decide which quality of video should be played. The player may consider various factors, such as, for example, available network speed and a size of a playback window. If either of these parameters change, the player may adjust the stream to a different quality video, request the media manifest, and switch immediately to requesting the media files at a given time in the video playback.

Continuing with the example, media content 123 may be encoded as a Hypertext Transfer Protocol (HTTP) live streaming (HTP) video stream, with up to six different quality or bitrates. Upon request from an end user device, the server 113 may respond with 3 links: the primary manifest, a player Uniform Resource Locator (URL), and an iFrame embed. The video player and the iFrame embed links may use the primary manifest to begin playback.

Figure 6A:
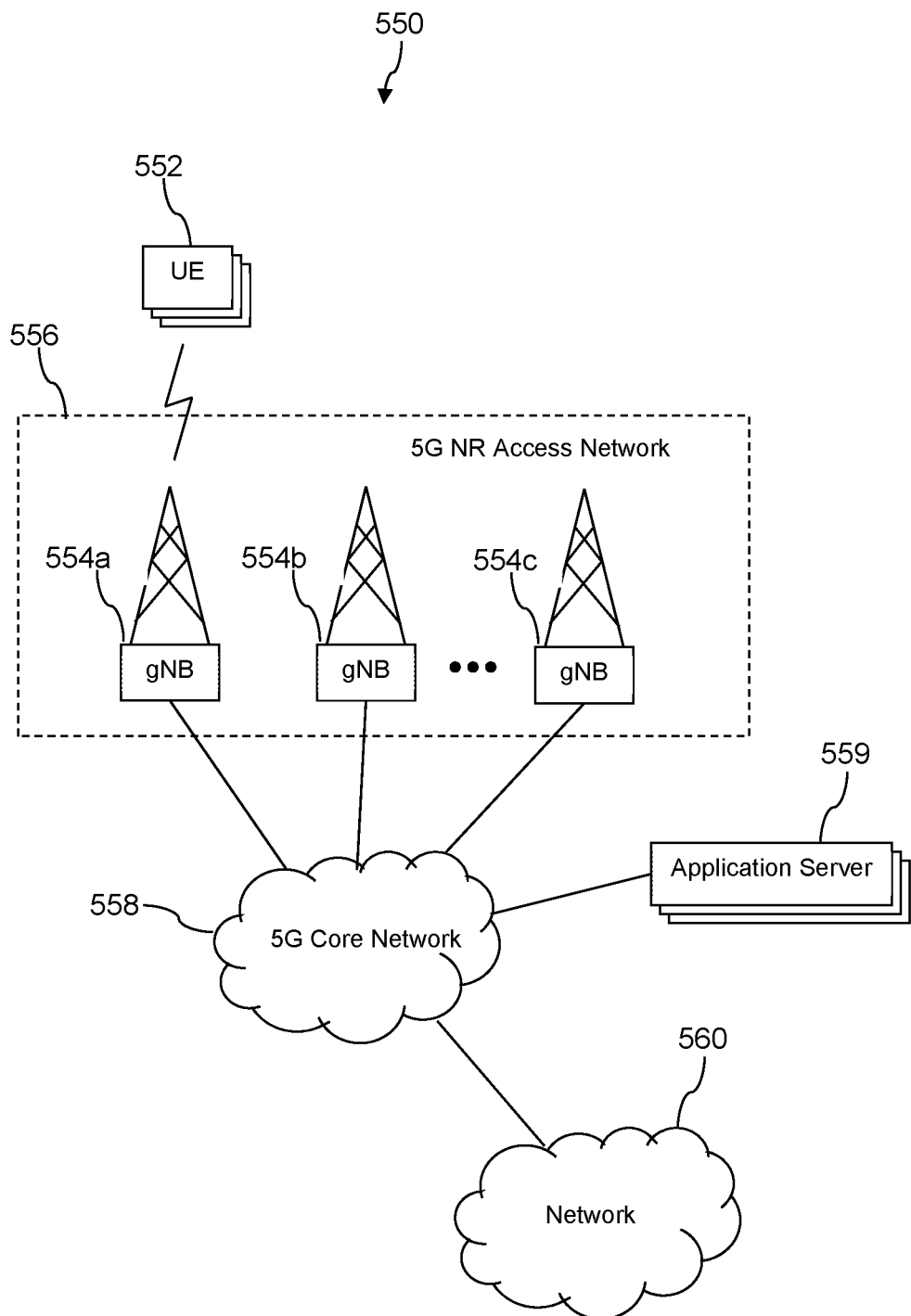
FIGS. 6A-B are block diagrams illustrating a communication system similar to the communication system of FIG. 1 according to an embodiment of the disclosure.

Turning now to FIG. 6A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as end user device 102 and the MEC server 107, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
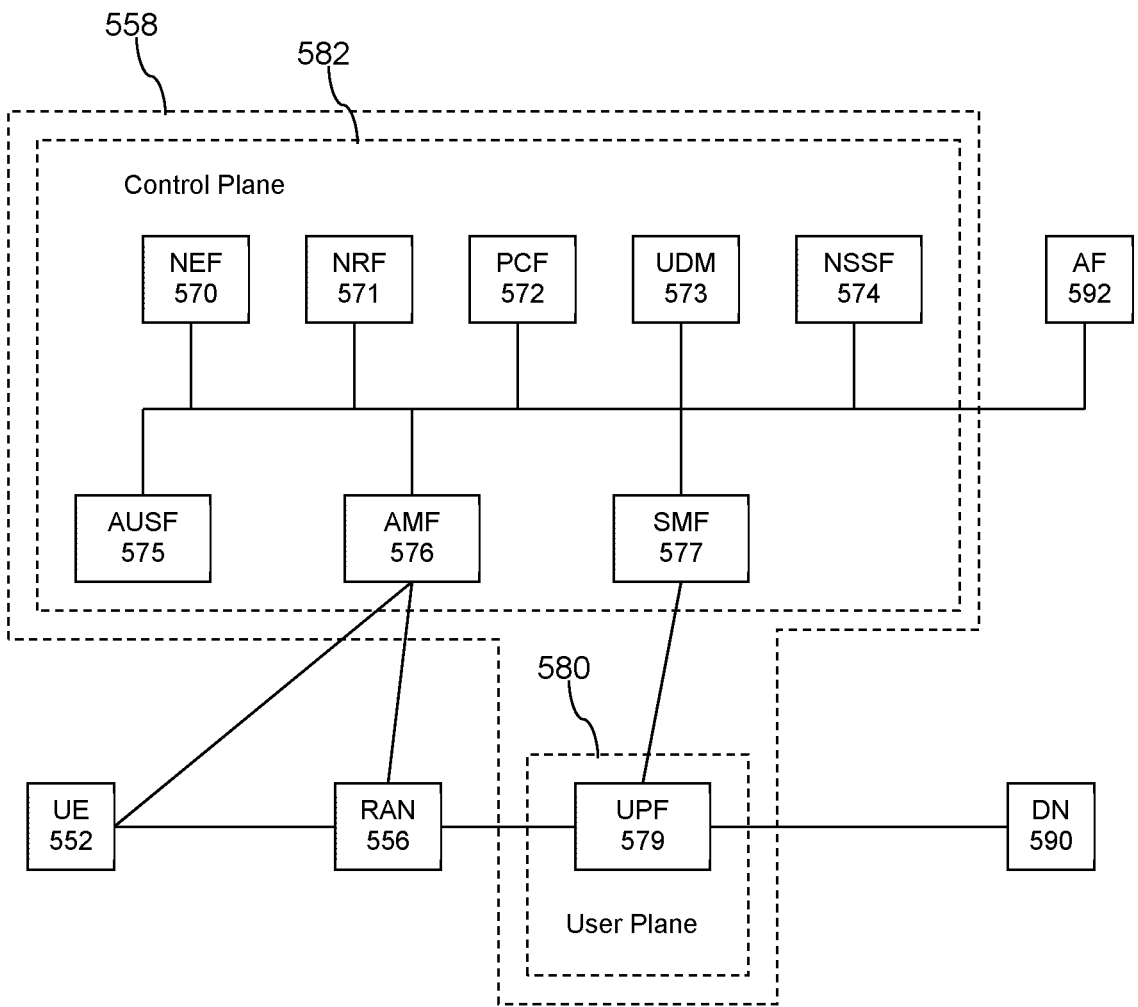

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
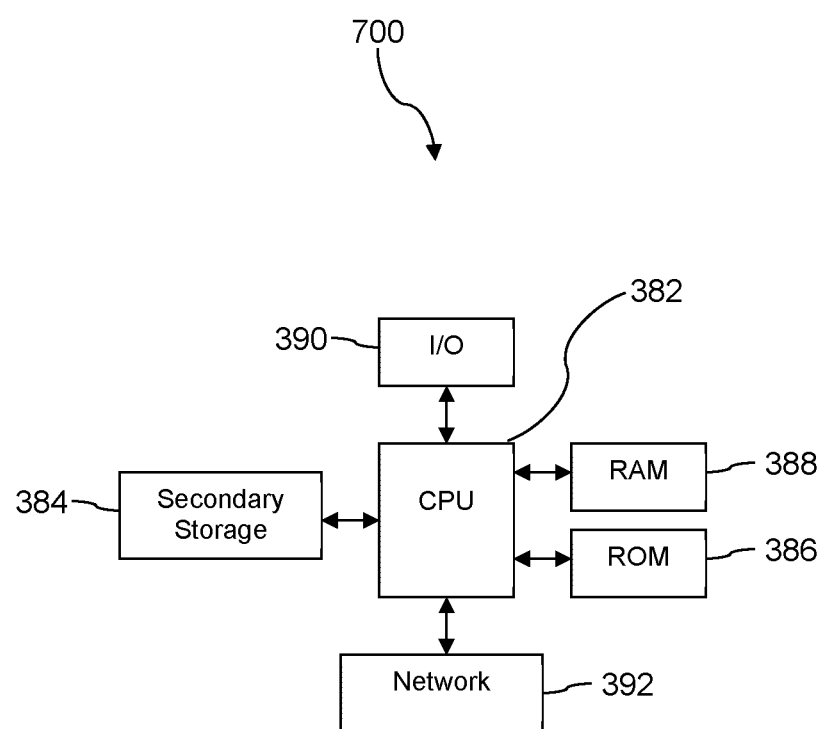
FIG. 7 is a block diagram of a computer system implemented within the communication system of FIG. 1 according to an embodiment of the disclosure.

FIG. 7 illustrates a computer system 700 suitable for implementing one or more embodiments disclosed herein. In an embodiment, the end user device 102, the MEC server 107, and the server 113 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for distributing rendering of media content across an end user device and a rendering device located at a single premise, wherein the method comprises:
   receiving, by at least one of the end user device or the rendering device, content, wherein the content comprises data associated with the media content that has not been rendered;
   receiving, by the end user device and the rendering device, one or more instruction sets, wherein the one or more instruction sets comprise instructions based on an optimal rendering distribution scheme determined based on device capabilities of the end user device and the rendering device;
   executing, at the rendering device, at least one instruction set of the one or more instruction sets to perform a first subset of processing and rendering operations on the content to obtain first rendered content;
   executing, at the end user device, at least one instruction set of the one or more instruction sets to perform a second subset of the processing and rendering operations on the content or the first rendered content to obtain second rendered content; and
   generating and displaying, at the end user device, a final render of the media content using the first rendered content and the second rendered content.

2. The method of claim 1, wherein the one or more instruction sets are included in a ledger.

3. The method of claim 2, wherein the executing at the rendering device is performed by a first instruction manager application, and wherein the executing at the end user device is performed by a second instruction manager application.

4. The method of claim 2, wherein the ledger further comprises a flag indicating that rendering and processing of the content is to be distributed across both the end user device and the rendering device in the premise.

5. The method of claim 1, wherein the one or more instruction sets are sent to the rendering device and the end user device in the form of distributed applications.

6. The method of claim 5, wherein the executing at the rendering device is performed by a first distributed application, and wherein the executing at the end user device is performed by a second distributed application.

7. The method of claim 1, wherein the content and the one or more instructions are received by at least one of the end user device or the rendering device in response to transmitting, by the end user device, a request for the media content to a server coupled to a storage system storing the content.

8. A system for distributing rendering of media content, comprising:
a rendering device at a single premise configured to:
receive content, wherein the content comprises data associated with the media content that has not been rendered,
receive at least a first instruction set, and
execute the at least the first instruction set to perform a first subset of processing and rendering operations on the content to obtain first rendered content; and
an end user device at the single premise configured to:
receive at least a second instruction set, wherein the first and second instruction sets comprise instructions based on an optimal rendering distribution scheme determined based on device capabilities of the end user device and the rendering device,
execute the at least the second instruction set to perform a second subset of the processing and rendering operations on the content or the first rendered content to obtain second rendered content, and
generate and display a final render of the media content using the first rendered content and the second rendered content.

9. The system of claim 8, wherein the first and second instruction sets are included in a ledger.

10. The system of claim 9, wherein the rendering device comprises a first instruction manager application that executes the at least the first instruction set, and wherein the end user device comprises a second instruction manager application that executes the at least the second instruction set.

11. The system of claim 8, wherein the first and second instruction sets are sent to the rendering device and the end user device in the form of distributed applications.

12. The system of claim 11, wherein the rendering device is further configured to receive a first distributed application that executes the at least the first instruction set, and wherein the end user device is further configured to receive a second distributed application that executes the at least the second instruction set.

13. The system of claim 8, wherein the end user device is further configured to transmit a request for the media content to a server coupled to a storage system storing the content, wherein the content and the first and second instruction sets are received in response to the transmission of the request.

14. The system of claim 8, wherein the first and second instruction sets are the same instruction set.

15. The system of claim 8, further comprising a server, wherein the server comprises a packaging application stored on a non-transitory memory of the server that, when executed by a processor of the server:
determines the optimal rendering distribution scheme based on the device capabilities of the end user device and the rendering device, and
generates the first and second instruction sets based on the determined optimal rendering distribution scheme.

16. A method for distributing rendering of media content across an end user device and a rendering device located at a single premise, wherein the method comprises:
receiving, by a packaging application stored and executed by a server, device capabilities of the end user device and the rendering device;
determining, by the packaging application, an optimal rendering distribution scheme based on the device capabilities of the end user device and the rendering device;
generating, by the packaging application, one or more instruction sets based on the determined optimal rendering distribution scheme; and
sending content and the one or more instruction sets to at least one of the end user device and the rendering device, wherein the content comprise data associated with the media content that has not been rendered, wherein the one or more instruction sets indicate that the processing and rendering of the content is to be distributed across both the end user device and the rendering device, and wherein a first instruction set of the one or more instruction sets is executed at the rendering device and a second instruction set of the one or more instruction sets is executed at the end user device to generate a final render of the media content that is displayed on a display of the end user device.

17. The method of claim 16, further comprising:
sending, by the packaging application, the one or more instruction sets to a ledger application stored and executed on the server; and
generating, by the ledger application, a ledger, wherein the ledger comprises the one or more instruction sets, and wherein the one or more instruction sets are sent to the at least one of the end user device and the rendering device in the form of the ledger.

18. The method of claim 17, wherein the content and the ledger are sent as a package.

19. The method of claim 18, wherein the package is sent in response the end user device transmitting a request for the media content to a server coupled to a storage system storing the content.

20. The method of claim 16, further comprising:
generating, by the package application, a first distributed application with a first instruction set of the one or more instruction sets;
sending, by the package application, the first distributed application to the rendering application for execution;
generating, by the package application, a second distributed application with a second instruction set of the one or more instruction sets; and
sending, by the package application, the second distributed application to the end user device for execution.

* * * * *